Jan. 23, 1968 E. I. VALYI 3,364,549

METHOD OF FORMING CHANNELED ASSEMBLY

Original Filed June 14, 1962

INVENTOR:
EMERY I. VALYI
BY
Robert H. Bachman
ATTORNEY

United States Patent Office 3,364,549
Patented Jan. 23, 1968

3,364,549
METHOD OF FORMING CHANNELED ASSEMBLY
Emery I. Valyi, Riverdale, N.Y., assignor to Olin Mathieson Chemical Corporation, a corporation of Virginia
Application Sept. 21, 1964, Ser. No. 398,127, now Patent No. 3,230,618, dated Jan. 25, 1966, which is a division of application Ser. No. 202,612, June 14, 1962, now Patent No. 3,201,858, dated Aug. 24, 1965, which is a continuation-in-part of application Ser. No. 732,663, May 2, 1958, now Patent No. 3,049,795, which is a continuation-in-part of abandoned application Ser. No. 586,259, May 21, 1956. Divided and this application Aug. 30, 1965, Ser. No. 499,126
1 Claim. (Cl. 29—157.3)

ABSTRACT OF THE DISCLOSURE

This disclosure teaches a method of forming channels between confronting faces of an imperforate sheet metal member and a porous body.

---

This application is a division of co-pending application Ser. No. 398,127, filed Sept. 21, 1964, now U.S. Patent 3,230,618, which in turn is a division of U.S. patent application Ser. No. 202,612, filed June 14, 1962, now U.S. Patent 3,201,858. The latter application is a continuation-in-part of U.S. patent application Ser. No. 732,663, filed May 2, 1958, now U.S. Patent 3,049,795, which in turn is a continuation-in-part of U.S. patent application Ser. No. 586,259, filed May 21, 1956, now abandoned.

As brought out in the aforesaid co-pending applications, the subject matter thereof was directed to novel features wherein a permeable body formed of powdered metal is joined to a supporting metal structure so as to become integral therewith in all areas except where they are formed between the permeable and impervious portions of the structure.

The result porous fabrication may be utilized advantageously in various applications. For example, it may be employed in the subsequent manufacture of gas burners that are intended to provide evenly distributed heat over large surfaces. In such application a combustible gas is distributed by the fluid channels to different portions of the permeable body through which it flows to emanate on the combustion side thereof substantially uniformly over most of the surface of that body at a substantially uniform rate, thus producing a flame blanket. The resultant porous fabrication may also be utilized advantageously in the construction of evaporative coolers whereby an efficient cooling surface is obtained by using the porous metal body as a means through which to distribute over a large area the liquid which is to evaporate for the purposes of transpiration cooling. In a further application, the porous fabrication may be utilized in the construction of filters wherein the porous metal body provides a controlled porosity and permeability so as to enable a liquid carrier to filter through the porous metal body while leaving filtrate on the other side thereof. As will be recognized, one of the most important limitations restricting the use of porous fabrications resides in the fact that it is very difficult and costly to provide conduits which conduct fluids efficiently to the appropriate faces or portions of the porous metal bodies, and therefrom to be distributed into and through such porous metal bodies for the purposes of combustion, evaporation, filtration, or other purposes. Another limitation of porous metal bodies restricting their use in components designed to transfer heat from one medium to another derives from the fact that the heat conduction of such porous bodies is less than that of solid metal bodies and that it is difficult and costly to effect efficient heat transfer to the porous bodies and through them. While the techniques and methods of producing pervious or porous bodies from powder metal have been extensively discussed in the literature such as for example in "Powder Metallurgy" by Dr. Paul Schwarzkopf (the MacMillan Company, New York, 1947) and "Powder Metallurgy" edited by John Wulff (the American Society for Metals, Cleveland, 1942) no economical and efficient method has been found thus far to overcome the limitations above referred to prior to the invention described in the aforesaid co-pending applications; the basic concept of the contribution therein comprises the forming of an intergral structure of two or more metal layers of differing characteristics, of which at least one layer is porous and pervious to fluids, such as gases or liquids, and the others impervious and solid, these layers being secured together, preferably through a sintering operation, although brazing and other means may also be employed, so as to enable the formation of fluid channels in predetermined portions between the confronting faces of various layers comprising the integrated porous structure.

In accordance with the disclosure of the aforesaid co-pending applications, the porous fabrication is formed from a supporting sheet metal member which may have all or a portion thereof in the form of a flat, relatively thin plate, sheet, or strip. A pattern of weld-inhibiting material is applied to this member in a design corresponding to that desired for the fluid conducting channels which are to be provided in the ultimate structure. Following the application of the weld-inhibiting material, a substantial layer of powdered metal aggregate is deposited upon the plate thus treated. Subsequent thereto this composite structure may be subjected to pressure to compact the powdered metal and to press it firmly against the solid plate. This compacted assembly is then exposed to a suitable sintering temperature under conditions preventing undesired reactions, such as oxidation of the metal. This sintering operation accomplishes the sintering of the powdered metal particles to each other together with the metallurgical bonding, welding, of the sintered metal aggregate to the solid member.

In an alternate method disclosed in the foregoing co-pending application, the powder metal layer may be separately formed by known powder metallurgy techniques. In this method the solid sheet metal member may be first prepared by applying a pattern of weld-inhibiting material to the portions thereof at which the fluid channels are to be formed, and applying to one side of the porous metal layer a suitable thin layer of soldering or brazing metal. The porous metal layer is then superimposed upon the solid plate so as to sandwich the weld-inhibiting material between them, and the composite subjected to a thermal treatment to accomplish the brazing or soldering of the porous metal layer to the sheet metal member in all adjacent areas thereof except in those portions separated by the weld-inhibiting material.

The resultant composite structure may now be adapted for the conducting of fluids by deforming or flexing those portions of the sheet metal member, which are disposed opposite the weld-inhibiting material, away from the porous metal layer. This can be accomplished for example by introducing a fluid under pressure into the ununited portions of the composite structure formed between the porous layer and a sheet metal member, or mechanically, by insertion of suitable mandrels into these areas. This deformation of the sheet metal member away from the porous metal layer will form fluid channels defined on one side by an impervious metal wall portion and on the other side by the porous metal.

As will be understood, various combinations of materials may be utilized in forming the integrated composite structure; and accordingly the solid sheet metal member and the porous layer or body may be of the same metal or alloy, or the porous structure and the solid member, of the integrated structure, may be comprised of different compositions. For example, both the porous metal layer and a solid sheet metal member may be formed of the same stainless steels, coppers, brass, carbon steels, aluminum or various combinations thereof. As will be understood the ultimate use of the resultant integrated structure determines the specific combination of alloys to be employed.

Accordingly, among the objects of this invention is to provide a novel method for making porous metal structures adapted to distribute a fluid and heat in flow therethrough.

Other objects and advantages of this invention will become more apparent from the following drawings and description in which FIGURE 1 is a perspective view illustrating one embodiment of the process of the present invention in a preliminary stage of fabrication;

Figure 1:
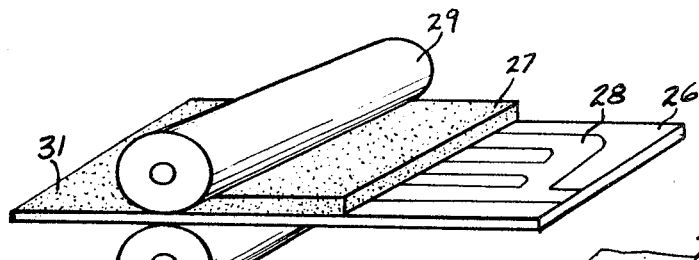

In regard to production of the porous body, it may be obtained by the so-called gravity sintering method which comprises a process wherein graded metal powder, frequently spherical metal powder, is poured by gravity into an appropriately shaped confined space, and usually vibrated to cause it to compact uniformly. As is obvious the choice of particle size of the metal powder will largely determine the amount of porosity, i.e. void space. The metal powder or aggregate so packed is then sintered in accordance with well-known powder metallurgy practices, producing a porous metal body whose bulk density, or apparent density, is but a fraction of the density of the metal or alloy from which the powder particles are obtained. Generally the conditions of vibration and conditions of sintering are chosen to result in an apparent density of approximately 25% to 75% of the solid density of the corresponding alloys. In another procedure for the production of such porous metal bodies the process may comprise blending intimately a graded metal powder with a combustible substance, such as, for example, wood flour or other organic particulate material, or a soluble material whose melting point exceeds the sintering temperature of the metal powder. After the formulation of this dry blend, the mixture of metal powder and combustible or soluble substance is then compacted under pressure, such as by rolling resulting in a body that has no voids and is reasonably firm, sufficient for handling. This body is then sintered in accordance with well-known powder metallurgy practices to produce a cohesive structure in which the metal particles are sintered together at their respective points of contact and the combustible or soluble material remains unbonded to the metal particles forming discrete islands within the metal body. Upon completion of the sintering operation and if the non-metallic component is combustible, then the resultant body will in fact contain void spaces everywhere previously occupied by the combustible material since the latter will have burned away in the course of sintering. In the case utilizing a soluble material whose melting point is higher than the sintering temperatures of the metal, the soluble material will remain intact after the final stages of sintering and can be subsequently removed by leaching and dissolving with a liquid, resulting in a network of interconnected pores.

In the modification of the foregoing it is noted the above described dry blend of metal powder and combustible or soluble substance may be replaced, respectively, by a paste or slurry obtained by suspending the admixed powder metal and combustible or soluble particles in a suitable liquid vehicle, as for example water or alcohol; or in applications where the combustible substance is mostly organic, by choosing a combustible substance that is a viscous liquid instead of being particulate such as for example a liquid phenolic resin. Alternately the mixture of metal powder and void or pore forming substance and vehicle, or void or pore forming substance alone, may be prepared into a paste which may be brought into the desired shape by pressing or extrusion.

A further method of producing the sintered porous metal bodies comprises melting a metal or alloy and casting it into the interstices of a porous aggregate of a particulate soluble material whose melting point exceeds that of the metal. Upon solidification of the metal, a component is produced which contains the network of the soluble material interspersed within the solid metal which soluble material is thereupon removed by leaching or dissolving, leaving behind it interstices that interconnect and form a porous network within the resultant metal body. Soluble substances contemplated for these purposes, be it for blending with solid metal powder or for the above casting process, comprise sodium chloride in conjunction with aluminum and aluminum alloys, aluminum fluoride in conjunction with copper alloys, and calcium oxide in conjunction with alloys having melting points higher than copper alloys. As will be understood other substances, particularly inorganic salts, are readily available and known to the art for such purpose as for example various phosphates, such as tri-sodium phosphate.

A still further method of producing a porous metal body comprises weaving or knitting metal wire into a mesh arranged in a plurality of layers. According to this process, a control of porosity is obtained by appropriate choice of wire diameters and openings arranged between adjoining wires as well as the juxtapositioning of superimposed layers of the woven or knit mesh.

Although a specific mass of sinterable metal has been described, it is pointed out that other formulations of sinterable materials may also be used, as for example those metal oxides, carbides and nitrides, or mixtures thereof, containing if necessary pore or interstice forming materials discussed above.

Various substances are known to be effective in preventing adhesion of one metal body to another, even under severe pressure, as in rolling, at elevated temperatures, as in the course of soaking prior to rolling, or diffusion-annealing, etc. In fact, many substances present in metal as accidental impurities, as for example manganese sulphide in steel, operate to produce seams and other discontinuties in rolled products. Among these substances are graphite, applied for example in the form of colloidial suspensions, boron nitride, talcum, zinc oxide, titania, and many others, each within certain limits of applicability that are not relevant here. In fact, it has been noted that on occasion during roll-welding of two superimposed sheets interference with the integration occurs even by the mere presence of an accidental oil smudge on the surface of the sheets. For purposes of the present invention, the separation or weld-inhibiting materials employed need not withstand exposure to high pressure or be capable of extending under pressure which normally are requisites of stop-weld resist used in pressure welding. Instead, the weld-inhibiting material employed as the spacer or supporting substance herein need only have reasonable mechanical strength to function as a spacer or support before the superimposed particulate material acquires strength of its own as the sintering operation progresses. The weld-inhiibting material employed as a spacer or supporting substance should preferably be capable of being applied at room temperature as a powder or by spraying, painting, extrusion, etc.; if needed, harden with the least time delay, and remain in place through the better part of the subsequent operations which usually comprise the application of a loose particulate metal layer of transporting the composite preparatory to a sintering operation and of sintering. Moreover, this spaced or supporting substance must be capable of removal following the sintering operation even if the channel network is extremely complex and tortuous.

Preferably the spacer or supporting substances contemplated herein are liquid soluble and have a melting point higher than the sintering temperature of the particulate metal layer, or at least higher than the temperature at which that layer commences to acquire reasonable mechanical strength in the course of sintering. Such soluble substances are for example sodium chloride, which melts at 801° C., a temperature somewhat below the customary sintering temperature of copper; and it may be used in connection with copper aggregate because the latter will acquire adequate strength during sintering before the sodium chloride begins to melt. Other such soluble substances are sodium aluminate (melting at 1650° C.), potassium sulphate (melting at 1076° C.), sodium metasilicate (melting at 1088° C.), aluminium chloride (melting at 1040° C.), and others. The choice of such soluble spacer or supporting substances will of course also depend on possible solid phase reactions with the metal surrounding them, at the temperatures of sintering. For example, while one of the most effective weld-inhibiting materials adapted for use as the spacer or supporting substance in connection with copper and aluminum alloys is graphite or carbon, austenitic stainless steel would be harmed by that spacer substance through carburizing.

In this respect it is pointed out that also contemplated within this invention is the utilization of a specific form of a carbon as a weld-inhibiting material in the fabrication of these composite structures. The particular form of carbon contemplated is that obtained in situ, from organic substances, by pyrolysis. As is known, progressive elevated temperature exposure of a variety of organic substances in inert or reducing atmospheres results in progressive thermal degradation of the organic material and ultimately in pyrolysis similar to coking. The residual carbonaceous matter is strong and cohesive as well as stable, except under oxidizing conditions at elevated temperatures. The resultant weld-inhibiting material, originally introduced as an organic substance may thus maintain reasonable mechanical strength and its functional integrity not only at room temperature but also throughout the process of heating during the sintering operation, while the powder metal acquires appreciable strength and ability to support itself over a preformed channel forming the groove of the desired composite structure. However, the organic material applied to the solid metal surface or within the preformed channel of a solid metal member, may be used as a weld-inhibiting material only if the carbonaceous residue remaining after the sintering operation is removable. This in turn depends upon the particular metal aggregate applied above it which must be pervious and porous enough to permit the ambient atmosphere to react freely with the contents of the channels. In such a case, the pyrolized organic substance will break down further and oxidize without residue, if the sintering furnace atmosphere is adjusted to allow for progressive formation of gaseous carbon compounds, or, as is preferable, if exposed to air while still hot enough to oxidize vigorously.

Figure 2:
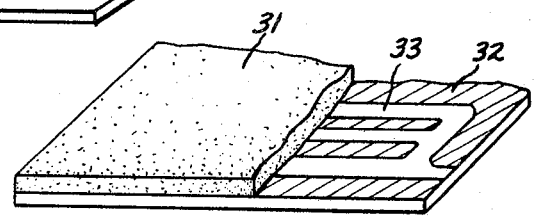
FIGURE 2 is a partial perspective view showing the embodiment of FIGURE 1 in a subsequent stage of fabrication.

FIGURES 1 and 2 illustrate an embodiment of this invention in which a metal sheet member 26 is joined to a sheet-like porous body 27. In this embodiment a pattern of weld-inhibiting material 28 is applied to a face of sheet metal member 21 followed by superimposing a sheet-like porous body 27, on member 26 so as to sandwich the stop-weld pattern between them, followed by joining the two components together as by pressure welding, between a pair of mill rolls 29 and 30, or by brazing, soldering, etc. This results in composite structure 31 which is joined in all adjacent portions 32 of the components that are not separated by the stop-weld material. The use of the weld-inhibiting material results in an unjoined portion 33 corresponding to the pattern of the material applied adapting the integrated composite 31 for the formation of fluid channels along the unwelded portions 33. Thereafter, the composite structure 31 may be further processed, as for example, in accordance with the teachings of the aforesaid copending applications, to distend the unwelded portions 33 into fluid channels of desired configuration. Alternately, the porous body 27 may be formed directly from powder metal applied to sheet 26 by any of the methods described in the co-pending application.

Figure 3:
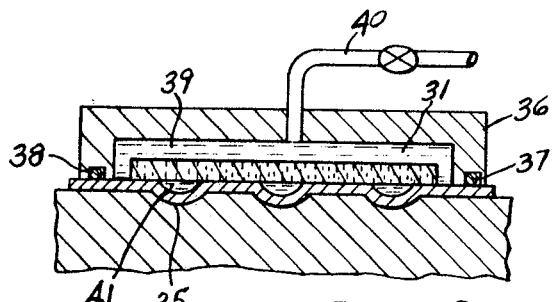
FIGURE 3 is a sectional view showing the processing of the embodiment of FIGURES 1 and 2.
Figure 4:
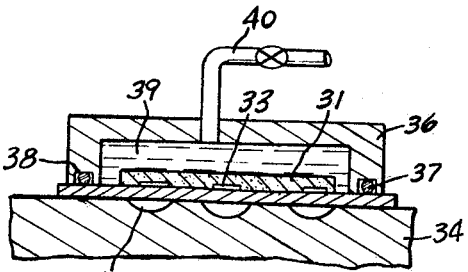
FIGURE 4 is a sectional view similar to FIGURE 3 in an earlier stage of processing.

In addition, to the means for forming the fluid channels, disclosed in the aforesaid co-pending applications, FIGURES 3 and 4 illustrate an additional novel and improved method for deforming and flexing away the unwelded portions 33 of the structure 31 for the formation of the desired channels by fluid means. As shown in the drawings, the above described composite structure such as 31, is clamped over a die 34 having machined into it grooves 35 corresponding to the contour of the channels to be formed upon deformation of the unwelded portions of the solid sheet metal component not joined to the porous layer. The clamping of the composite member 31 is accomplished by means of a coacting die section 36 which is suitably mounted to conventional reciprocating means, not shown, for raising or lowering the section 36 to and away from mating or operating relationship with forming die 34. Coacting section 36 is maintained in sealing relationship with the composite structure by means of an O-ring 37 mounted in an annular groove 38. As shown in the drawings, to facilitate the sealing desired for the formation of the fluid channels, the solid sheet metal member extends beyond the peripheral edges of porous layer leaving a portion of the solid member exposed for clamping within the O-rings 37 of the coacting die section 36. Coacting die section 36 is further provided with a fluid compartment 39 for receiving and containing a suitable hydraulic fluid, such as water, air and the like, from conduit 40 connected to a suitable source of fluid and in communicating relationship with compartment 39. In operation, fluid under high pressure, for example water at approximately 3,000 pounds per square inch, is introduced into the fluid chamber 39 above the sintered porous metal layer, however, the fluid pressure required for this operation is not introduced instantaneously but essentially at two rates applied in sequence. First the fluid is introduced at a rate which is no faster than it may penetrate the interstices, or pores, of the porous layer. As will be obvious this rate depends on the degree of porosity of the porous layer and upon the viscosity of the pressure fluid. After the porous layer is saturated with pressure fluid, additional fluid is introduced at the above mentioned operating pressure at a rate no faster than the respective fluid can flow through the porous metal layer at a given pressure, nor faster than the solid layer adjacent the weld inhibiting material can be deformed without damage. As a result, due to saturation of the porous layer with pressure liquid, the porous layer itself will be in hydrostatic equilibrium and therefore not subject to any deformation. However, the solid metal layer will not be in equilibrium in the regions that are both provided with weld inhibiting material and also unsupported by the die 34, in other words, in those portions of the unwelded area disposed opposite the die grooves 35. For this reason, the solid metal component will commence to deform under the action of the pressure fluid in the unwelded areas formed by the weld inhibiting material, and continue to deform until a respective solid metal layer reaches the contour of the die grooves 35 in die 34. This deformation of the solid sheet metal member provides fluid channels 41 disposed between the confronting faces of the solid sheet metal member and the sintered porous metal layer.

Figure 5:
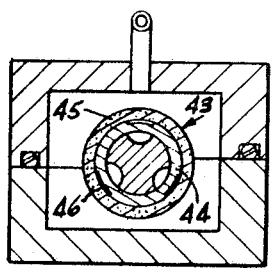
FIGURE 5 is a sectional view along the line V—V of FIGURE 6 showing the processing of an alternate embodiment of the present invention.
Figure 6:
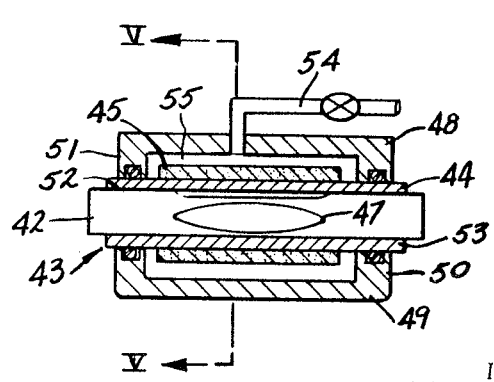
FIGURE 6 is a sectional view showing an alternate embodiment of the present invention.

FIGURES 5 and 6 illustrate the application of this fluid forming procedure to tubular structures 43, which is comprised of a hollow cylindrical sheet metal body 44 enveloped by a cylindrical sintered metal porous body 45 having its longitudinal edges disposed in spaced relationship to corresponding longitudinal edges of the cylindrical body 44. In accordance with any of the preceding methods discussed above, this tubular structure 43 is adapted for the formation of fluid channels by providing, for purposes of illustration, between the confronting faces of the body 44 and the porous layer 45 with a plurality of longitudinally extended unwelded areas 46 circumferentially spaced within the structure 43. This tublular structure is adapted for formation of fluid channels by the insertion within it of a forming die mandrel 42 preferably sectionalized for subsequent removal and provided with grooves 47 corresponding to the desired channel pattern with the grooves disposed opposite the unwelded areas 46 of the tube structure 43. This tube-mandrel assembly is then sealed within a fluid chamber formed by section halves 48 and 49 by virtue of their coacting end walls 50 and 51 adapted to abut in sealing relationship by means of O-rings against portions 52 and 53 of the sheet metal body 44 which extend beyond the longitudinal ends of the porous sheet metal envelope 45. In operation a fluid pressure is introduced through conduit 54 into chamber 55 whereby the fluid permeates through the porous envelope 45 to deform portions of the cylindrical body 52 against the contour of grooves 47 formed in the mandrel 42.

As will be understood, the selection of materials from which the porous and solid components are made to comprise the structures described herein and in the co-pending application, is based on considerations within the skill of persons acquainted with mechanical, physical and chemical properties of materials. While the structures described herein have been identified as being metallic on numerous occasions, it is pointed out that all or parts of these structures may be made of non-metallic materials, as called for by their intended use. Thus, the porous layer may incorporate catalysts, as pointed out in the co-pending application, which catalysts may be non-metallic. The porous layer may also consist in part or entirely of glasses, carbides, nitrides, oxides, or borides, for example in instances calling for heat resistance, corrosion resistance or insulating properties not available in metals and alloys. The porous layer may also consist of synthetic polymeric substances, for similar reasons, as for example sintered porous fluoro-carbon resins, silicone resins and others. The solid component is usually made of metal strip or plate which may be coated with non-metallic materials of the kind referred to. In instances not calling for high strength the solid component may also be made of synthetic resins made into strip, sheet or plate stock.

Several of the embodiments described herein may be made advantageously of non-metallic components. Thus, a component intended to distribute highly corrosive inorganic acid vapors may be made of fluorocarbon resins; another intended to serve as diffuser of combustible gas also acting as a radiant burner may be made in part of silicone carbide. Other examples are obvious to those skilled in the art of constructing components to be used in environments of high temperature and corrosive attack.

It will be understood that the porous layer referred to herein may be produced in still additional ways either in situ, upon the surface of a solid component or separately, to be joined thereto. Thus, the porous component may be produced by mechanical perforation of a solid metallic sheet, however, such a method would generally be expensive and cumbersome. The porous layer may also be produced by spraying of metal by techniques well-known to those skilled in the metal working art and carried out either with a wire gun or a powder gun, whereby, through appropriate and well-known adjustment of the spray gun, the spraying process may be directed so as to produce a porous sprayed deposit. A porous sprayed deposit may also be produced with a powder gun by spraying along with the material intended to form the porous layer and intimately intermingled with it an evanescent solid which will be deposited along with the rest of the sprayed material and which may then be removed from the porous composite by leaching as described in previous examples. However, this procedure of producing the porous layer by spraying is also cumbersome and expensive in most instances, compared to the other means described herein and in the co-pending applications.

As indicated above, the composite structures of this invention are adapted for many applications and particularly for use as heat exchangers. It is well known, tubular components used in heat exchangers were heretofore usually provided with fins, corrugations and other extensions of their surface so as to present an economic maximum extended surface area for a given weight of heat exchanger structure. However, such heat exchanger structures can be provided with greatly increased heat transfer surfaces by i.e., heat conductive bonding of a solid sheet metal unit to a sheet-like layer of sintered porous metal in accordance with any of the methods described heretofore. As has been discussed the sheet-like porous metal component is attached to the solid sheet metal unit by a metallic bond which will warrant good heat transfer with channels provided between the confronting faces of the components by interrupting the metallurgical bond in predetermined areas and in a predetermined pattern. These channels serve to conduct a fluid between the solid and porous layers with subsequent diffusion of flow through the porous body, thereby contacting the large surface area within the porous body, as defined by the innumerable interstices extending between the integrated particles of the porous body. For example for application in refrigerator systems, where the solid sheet metal unit is internally laminated with its laminations distended into a system of fluid passageways, the fluid contained within the solid metal component may be water and the fluid contained within the channels may be liquid refrigerant or refrigerant vapor, as would be the case when such composite structures are used as refrigeration condensers or evaporators.

Although the invention has been described with reference to specific embodiments, materials and details, various modifications and changes, within the scope of this invention, will be apparent to one skilled in the art and are contemplated to be embraced within the invention.

What is claimed is:

1. A method of forming channels between confronting faces of an assembly comprised of an imperforate sheet metal member and a superimposed porous body having stop-weld material interposed between said faces in a pattern corresponding to a desired system of fluid channels, comprising placing said assembly on a rigid die embossed in portions thereof disposed opposite said stop-weld material with said embossments having a configuration desired to be imparted to said channels and with the solid member of said assembly being disposed adjacent said die, forming adjacent said porous body a chamber sealed to the atmosphere and adapted to receive a fluid under pressure, injecting said fluid in said chamber at a pressure sufficient to force portions of said member opposite said stop-weld material against said embossments with said fluid pressure being injected at a rate insufficient to deform portions of said porous body opposite said stop-weld material.

References Cited

UNITED STATES PATENTS

| | | | |
|---|---|---|---|
| 2,759,247 | 8/1956 | Grenell et al. | 29—157.3 |
| 2,845,346 | 7/1958 | Scanlon et al. | 75—208 |
| 3,031,746 | 5/1962 | Ciarleglio et al. | 29—423 X |
| 3,094,956 | 6/1963 | Pauls | 29—157.3 X |
| 3,110,090 | 11/1963 | Isbal et al. | 29—157.3 |
| 3,138,009 | 6/1964 | McCreight | 75—222 X |
| 3,140,327 | 7/1964 | Dettmer | 29—410 |
| 3,170,229 | 4/1965 | Wenger | 29—157.3 |

JOHN F. CAMPBELL, *Primary Examiner.*

PAUL M. COHEN, *Assistant Examiner.*